(No Model.)

F. W. HEDGELAND.
PNEUMATIC ACTION FOR ORGANS.

No. 476,796. Patented June 14, 1892.

Witnesses:
Geo. E. Curtis
H. W. Munday

Inventor:
Frederick W. Hedgeland
By Munday Evarts & Adcock
his Attorneys.

UNITED STATES PATENT OFFICE.

FREDERICK W. HEDGELAND, OF CHICAGO, ILLINOIS.

PNEUMATIC ACTION FOR ORGANS.

SPECIFICATION forming part of Letters Patent No. 476,796, dated June 14, 1892.

Application filed November 23, 1891. Serial No. 412,742. (No model.)

*To all whom it may concern:*

Be it known that I, FREDERICK W. HEDGELAND, a citizen of the United States, residing in Chicago, in the county of Cook and State of Illinois, have invented a new and useful Improvement in Pneumatic Actions for Organs, of which the following is a specification.

My object in this invention is to greatly simplify the construction of this class of actions and also to obtain better results in the matter of quick speaking by the pipes than have been heretofore secured.

In practicing the invention I employ small bellows for the purpose of opening and closing the valves connecting the pipes with the wind-chest and maintain a pressure in such bellows greater than that in the wind-chest, so that the valve is opened whenever the pressure in the bellows is reduced below that in the wind-chest and closed the instant the pressure in the bellows is again brought above that in the wind-chest.

One of the leading features of my invention relates to the means employed for creating the unequal pressure in the valve-bellows and wind-chest; and it consists in the combination, with the organ having the pneumatic action, of a double bellows, or, in other words, two bellows, one inside of the other, the inner one receiving the air from the feeders and when it is filled venting into the outer bellows. The pressure is greater in the inner bellows, and a pipe connects this bellows with the series of valve-operating bellows, while the outer or larger bellows, in which the pressure is less, is connected by a pipe with the wind-chest.

The nature of my improvements will be more fully understood from the accompanying drawings and the description given below.

Figure 1:
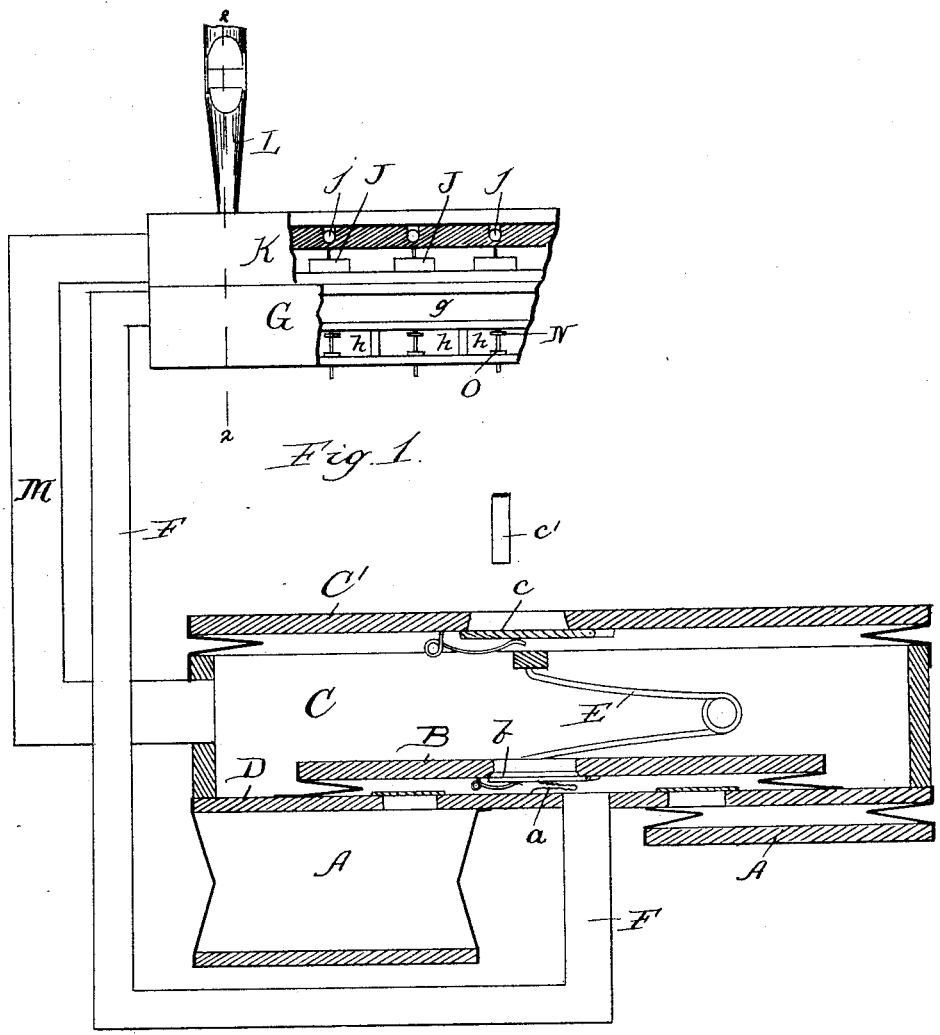
Figure 2:
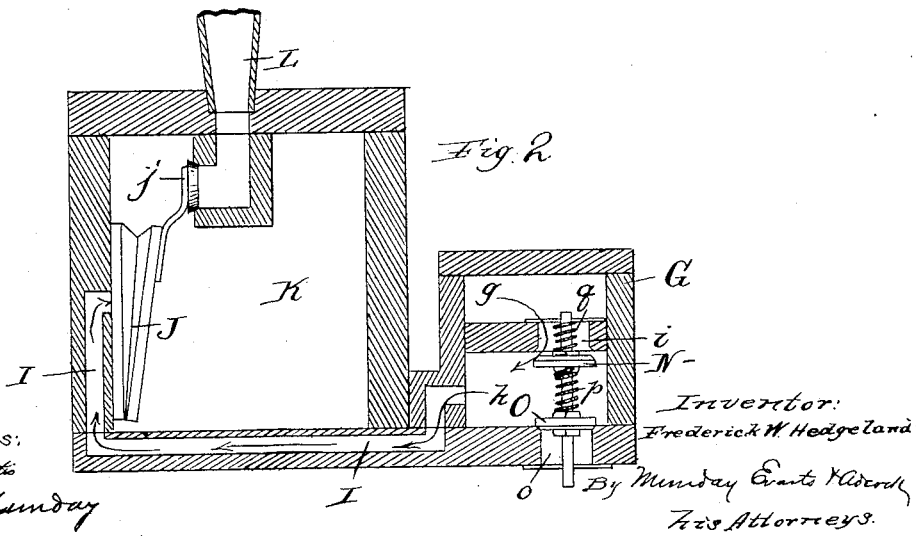

In the drawings, Figure 1 is an elevation partly in section, showing so much of an organ as is necessary to illustrate my invention. Fig. 2 is a cross-section on the line 2 2 of Fig. 1 of the wind-chest.

In said drawings, A A represent the feeders of the air-supplying bellows of the organ. Each of these feeders discharges into the inner bellows B, located in the well C and supported upon the bottom board D. $b$ is the vent-valve of this inner bellows, and $a$ the cord which when distended opens said vent-valve.

E is the spring for creating pressure in bellows B. All the air being first supplied to this inner bellows, it results that the inner bellows must be first fully inflated before any of the air can be admitted into the "outer bellows," as it may be termed, which is composed of the well C and the expanding portion C', mounted thereon. By means of the spring E, I am enabled to create any desired pressure in bellows B before any supply of air is admitted to the outer bellows, and hence I can make the pressure of the inner bellows as much greater than that of the outer bellows as may be necessary, and I prefer to make it at least double that of the outer bellows. The latter bellows is of course provided with the usual vent-valve $c$, which may be operated by a stationary stop $c'$.

The inner bellows B is connected by a pipe or conduit F with the chest G, containing the series of valves for controlling the small or valve-carrying bellows at the pipes. This valve-chest is divided into a chamber $g$, common to all the valves therein, and which receives the supply of air from the pipe F and into independent valve-chambers $h$. Each of these chambers $h$ is connected by an air-passage I with the interior of the small bellows J in the wind-chest K, of which small bellows there is one for each of the pipes L employed in the organ. The bellows J are of the ordinary construction, having each a single air-compartment and a movable side hinged at its end. To the swinging end of each of the movable sides I attach a valve $j$, which closes the passage-way leading from the wind-chest into the pipe.

In the partition dividing the chamber $g$ from the undivided or separate chambers $h$ of the valve-chest G are a series of valve-controlled openings $i$, which are normally open, so that the pressure created by and received from the bellows B is constantly present in the series of small bellows J, while at the same time by means of a suitable conduit—such as M, connecting the outer bellows with the wind-chest—the pressure of the outer bellows is constantly felt in the wind-chest. In each of the openings $i$ are valves N, which are lifted when the keys to which said openings pertain are struck and close the openings.

Each chamber $h$ is provided with an outlet $o$, controlled by a valve O, mounted, preferably, upon the same stem with the valve N, so as to be operated simultaneously therewith by the striking of the key. The operation of these valves N and O is as follows: When the key to which the valves belong is depressed, the stem upon which they are mounted rises and closes the opening $i$ and opens the outlet $o$. This, as it will be readily seen, results in an immediate reduction of the pressure in the corresponding bellows J, the admission of fresh air being shut off by valve N, and the exit of the air already in the chamber $h$ and passage I being permitted by the opening of valve O. The valve N is loose upon its stem, so that when the stem is lifted it may continue to move upward after said valve has reached its seat. This is permitted by the presence of the spring $p$ upon the stem and below the valve. The spring $q$ upon the stem above the valve returns the valve to its normal position as soon as the player releases the key, so that the stem is at liberty to fall.

The operation of my invention is as follows: The blowing apparatus being set in motion the feeders quickly fill the inner bellows B, and through the conduit F and other connecting-passages create a pressure in the pipe-valve bellows J. This pressure is uniform throughout the series of bellows J and is normally present in all of them while the organ is being used. When the bellows B and the parts supplied by it have all been filled and the pressure has attained the requisite degree to fully expand the bellows B, the vent $b$ is opened and admits air to the outer bellows, and from this latter bellows the wind-chest is charged with a lesser pressure, however, than that in the bellows J. Supposing now a key be struck, the valve O will be opened and the valve N closed, thereby relieving the pressure upon one of the small bellows J. The pressure in the wind-chest now overcomes that in this particular small bellows, so as to open the valve $j$ and allow the pipe L, controlled by it, to speak. This condition continues so long as the player retains his hand or foot upon the key or pedal operating the valves N and O, and upon his releasing the key or pedal the valve N immediately opens and valve O closes, and the normal pressure is renewed in the bellows J and the pipe is shut off.

It will be noticed that there are very few parts in my action liable to get out of order and that no springs are required to act upon the small bellows J. The action is therefore cheap to manufacture and durable, and it is also very quick in action, the pipes speaking instantly and much more quickly than in other organs.

I claim—

1. The combination, in a pneumatic action and with the small bellows J, of chamber $g$, supplying the air for the small bellows, separate chambers $h$, located between said supply-chamber and the bellows and having an outlet for relieving the pressure, a valve for controlling said outlet, and another valve for shutting off the air from the supply-chamber, both the said valves being upon a common stem and the latter being loosely mounted thereon, substantially as set forth.

2. In a pneumatic action for organs, the combination, with the small bellows for operating the valves of the pipes and the wind-chests, of a bellows B, supplying the air to the inside of said small bellows, and another bellows surrounding said bellows B and receiving its air therefrom for supplying the wind-chests, substantially as set forth.

3. The combination, with the wind-chest and the series of small bellows located in the wind-chest, of an inner and an outer supply bellows, one of said bellows being connected by an air-passage to the small bellows and the other by another passage to the chest, substantially as specified.

4. The combination, in a pneumatic action, of inner bellows B, receiving the air from the feeders, and an outer bellows C C', receiving air from said inner bellows, substantially as set forth.

5. The combination, in a pneumatic action, of inner bellows B, receiving the air from the feeders, pressure-creating spring E, and an outer bellows C C', charged from said inner bellows, substantially as set forth.

6. In a pneumatic action, the combination of inner bellows and outer bellows and pipe connections from each of said bellows, one conduit carrying the air to the wind-chest and the other to the valve-operating bellows, one of said first-mentioned bellows being adapted to create a greater pressure than the other, substantially as set forth.

7. In a pneumatic action, a valve $j$, secured directly to the movable side of the single-compartment small bellows J, and means for creating unequal air-pressures upon the inner and outer surfaces of said movable side, substantially as set forth.

8. The combination, with the speaking-pipes and pneumatic action of an organ, of the double bellows shown, one part of said bellows sounding the pipes and the other operating the action, substantially as set forth.

9. The combination, with the pipes and the bellows for sounding the same, of a pneumatic action and a bellows for operating the latter, one of said bellows having feeders and venting into the other bellows, substantially as set forth.

10. The combination, with an organ, of two wind-supplying bellows, one of said bellows being provided with feeders and venting its excess pressure into the other bellows, whereby unequal pressures may be created by the use of a single blowing apparatus, substantially as specified.

FREDERICK W. HEDGELAND.

Witnesses:
H. M. MUNDAY,
EMMA HACK.